US008799938B2

(12) United States Patent
Kudelski et al.

(10) Patent No.: US 8,799,938 B2
(45) Date of Patent: Aug. 5, 2014

(54) SYSTEM AND METHOD TO PREVENT MANIPULATION OF TRANSMITTED VIDEO DATA

(75) Inventors: André Kudelski, Lutry (CH); Christophe Nicolas, St. Prex (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 298 days.

(21) Appl. No.: 13/067,922

(22) Filed: Jul. 7, 2011

(65) Prior Publication Data

US 2012/0017233 A1    Jan. 19, 2012

Related U.S. Application Data

(60) Provisional application No. 61/364,834, filed on Jul. 16, 2010.

(30) Foreign Application Priority Data

Oct. 7, 2010    (EP) .................................. 10186869

(51) Int. Cl.
*H04H 20/14*    (2008.01)
*H04N 17/00*    (2006.01)

(52) U.S. Cl.
USPC ............................................ 725/22; 348/180

(58) Field of Classification Search
USPC ..................................... 725/22, 119; 348/180
See application file for complete search history.

(56) References Cited

U.S. PATENT DOCUMENTS

| | | | |
|---|---|---|---|
| 6,370,209 B1 | 4/2002 | Zeller et al. | |
| 7,801,305 B2 | 9/2010 | Lecomte et al. | |
| 7,937,723 B2 * | 5/2011 | Weissmueller et al. | 725/22 |

(Continued)

FOREIGN PATENT DOCUMENTS

| | | |
|---|---|---|
| DE | 102008003364 A1 | 7/2009 |
| WO | WO 2004/073292 | 8/2004 |
| WO | WO-2006059053 A1 | 6/2006 |
| WO | WO-2007148264 A1 | 12/2007 |

OTHER PUBLICATIONS

European Search Report for EP 10186869.3 filed Oct. 7, 2010.

(Continued)

*Primary Examiner* — Nasser Goodarzi
*Assistant Examiner* — Hyun Hong
(74) *Attorney, Agent, or Firm* — Harness, Dickey & Pierce

(57) ABSTRACT

The aim of the invention is to provide a solution to ensure that the content sent by the IRD is the content effectively displayed on the screen.

It is then proposed a system to prevent manipulation of transmitted video data comprising an Integrated Receiver Decoder (IRD) receiving audio/video data, a display device (TV), said IRD comprising means to transmit an HDMI compliant audio/video data stream toward the display device. This system comprising:

means to define a variable area at a location of the image displayed on the display device, means to store reference data corresponding to video data of said area which are sent to the display device.

means internal or external to the display device to extract the actual displayed video data of said area, means to send, to said IRD, test data determined from said extracted video data, means to compare said test data with said reference data, means for switching an operating mode of the system from a standard mode to a disrupted mode in case of difference resulting from this comparison.

18 Claims, 3 Drawing Sheets

(56) References Cited

U.S. PATENT DOCUMENTS

| | | | |
|---|---|---|---|
| 2004/0078575 A1* | 4/2004 | Morten et al. | 713/176 |
| 2006/0210075 A1 | 9/2006 | Lecomte et al. | |
| 2007/0157224 A1* | 7/2007 | Pouliot et al. | 725/22 |
| 2007/0266153 A1* | 11/2007 | Barrett et al. | 709/225 |
| 2007/0277041 A1 | 11/2007 | Kulessa et al. | |
| 2009/0180755 A1* | 7/2009 | Kanemaru et al. | 386/84 |
| 2009/0313675 A1* | 12/2009 | Howarter et al. | 725/119 |
| 2009/0324199 A1 | 12/2009 | Haitsma et al. | |
| 2010/0246955 A1* | 9/2010 | Wright et al. | 382/173 |

OTHER PUBLICATIONS

International Search Report and Preliminary Report on Patentability dated Oct. 14, 2011 issued in corresponding International Application No. PCT/EP2011/060652.

* cited by examiner

SYSTEM AND METHOD TO PREVENT MANIPULATION OF TRANSMITTED VIDEO DATA

This application claims the benefit of U.S. Provisional Application No. 61/364,834, filed Jul. 16, 2010 and European Patent Application No. 10186869.3 filed Oct. 7, 2010, the entire contents of which are hereby incorporated by reference.

INTRODUCTION

The present invention concerns the field of television devices, in particular a set-top-boxes (or IRD Integrated Receiver Decoder) designed to providing additional media experience on the television.

PRIOR ART

The today's situation is described in respect with the FIG. 1. The IRD is connected to the various sources of data (IP, satellite, cable, antenna) and is in charge of extending the capabilities of the television by providing decryption of the encrypted data as well as handling the access rights. The IRD proposes also storage capabilities, parental control with identification of the user to apply the proper profile and a program guide. The output is connected to a television or a screen to take advantage of the multimedia experience.

One of the revenue model of the media content providers is the advertisement introduced during appealing broadcast content. It is therefore important that the advertisements sent by the IRD to the television is not replaced by other information.

BRIEF DESCRIPTION OF THE INVENTION

The aim of the invention is to provide a solution to ensure that the content sent by the IRD is the content effectively displayed on the screen.

It is then proposed a system to prevent manipulation of transmitted video data comprising an Integrated Receiver Decoder (IRD) receiving audio/video data, a display device (TV), said IRD comprising means to transmit an HDMI compliant audio/video data stream toward the display device. The system comprises:
  means to define a variable area at a location of the image displayed on the display device, i.e. a versatile portion within the image displayed on this device,
  means to store reference data corresponding to video data of said area which are sent to the display device.
  means internal or external to the display device to extract the actual displayed video data of said area,
  means to send, to said IRD, test data determined from said extracted video data,
  means to compare said test data with said reference data,
  means for switching an operating mode of the system from a standard mode to a disrupted mode in case of difference resulting from this comparison.

It is also proposed a decoder to be used within a system for preventing manipulation of transmitted video data, comprising means for receiving audio/video data and means for transmitting an HDMI compliant audio/video data stream to be displayed on a display device, characterized in that it comprises means to define a variable area at a location of an image displayed on the display device, means to store reference data corresponding to video data of said area which are sent to be displayed, means for receiving test data determined from extracted data displayed on said display device, means to compare said test data with said reference data, means for switching an operating mode of the decoder from a standard mode to a disrupted mode in case of difference resulting from this comparison.

Finally, it is proposed a dongle to prevent manipulation of transmitted video data comprising means for connecting it to a display device displaying video data, means for extracting a part of said video data according to a variable area of said display device and means for sending test data determined from the extracted video data.

BRIEF DESCRIPTION OF THE FIGURES

The present invention will be better understood thanks to the attached figures in which:

The FIG. 1 illustrates the standard known system.

Figure 2:
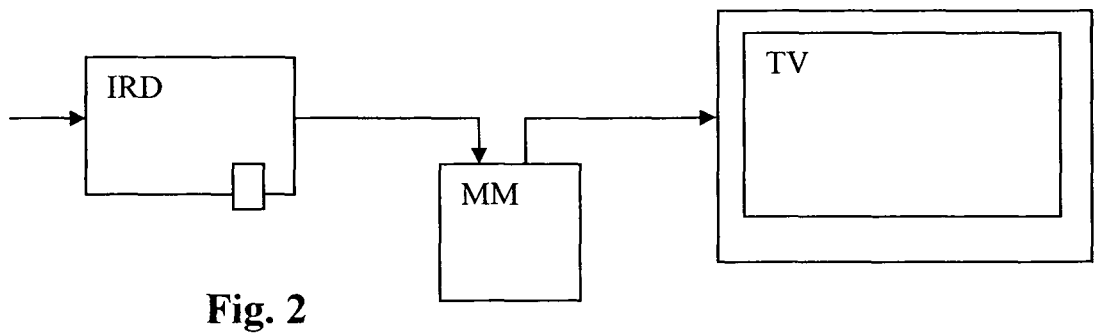

The FIG. 2 shows the so-called "man-in-the-middle" attack

Figure 3:
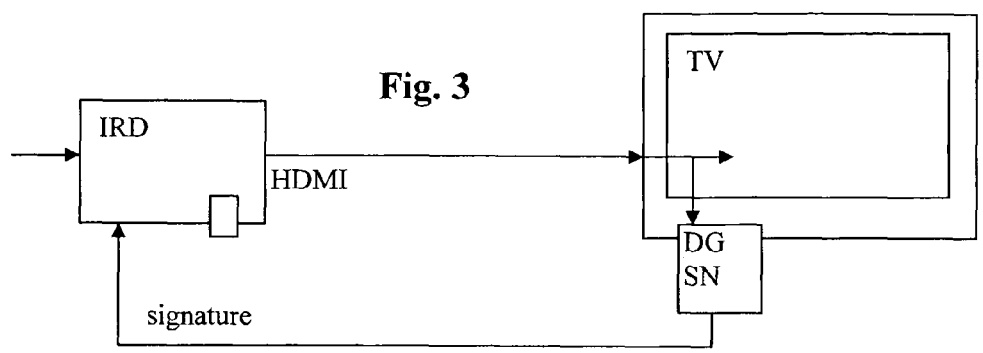
Figure 4:
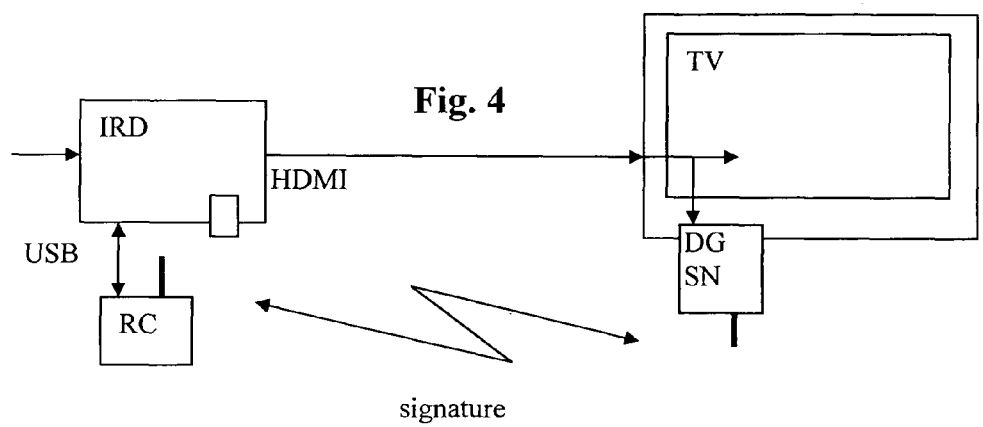
Figure 5:
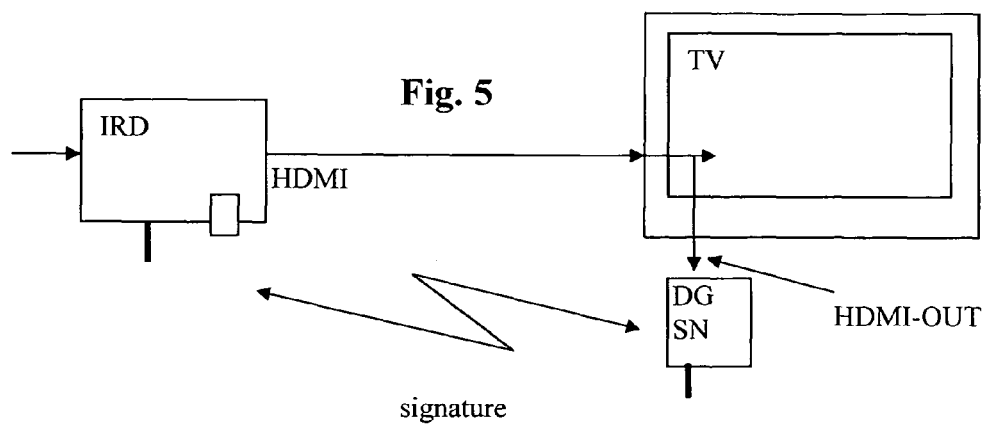

The FIG. 3 illustrates the invention using a dongle to determine the actual displayed image The FIG. 4 is similar to the FIG. 3 with the difference that feedback data is sent wirelessly The FIG. 5 illustrates the same embodiment as the FIG. 4 with an external dongle wireless received on the IRD side.

Figure 6:
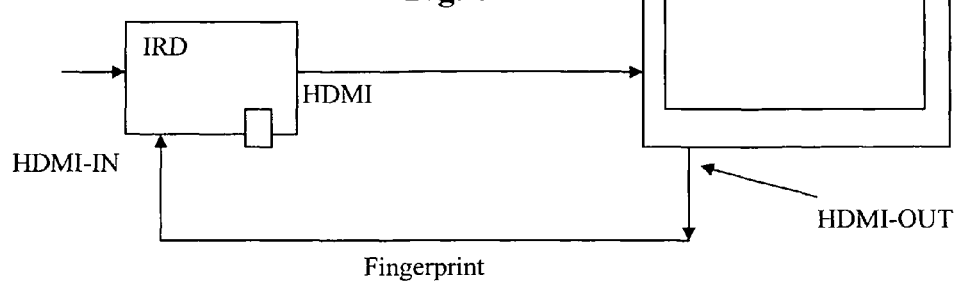

The FIG. 6 illustrates the case with a second HDMI feedback channel

Figure 7:
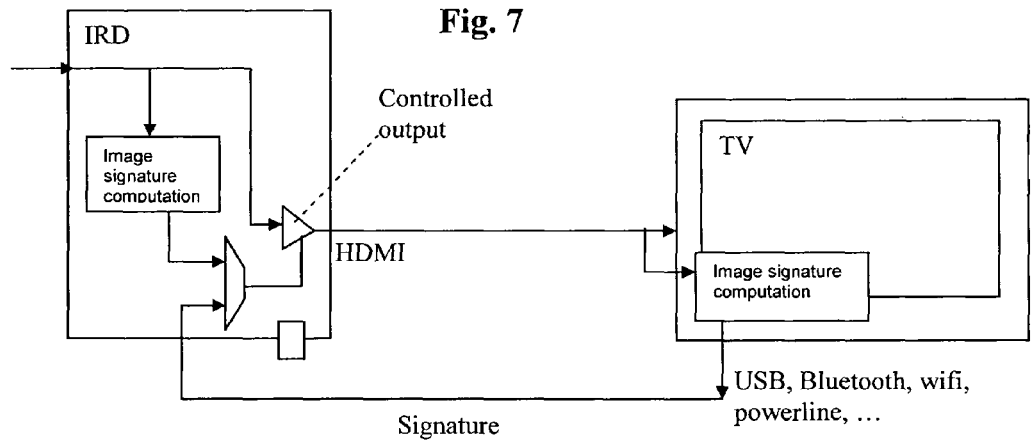
Figure 8:
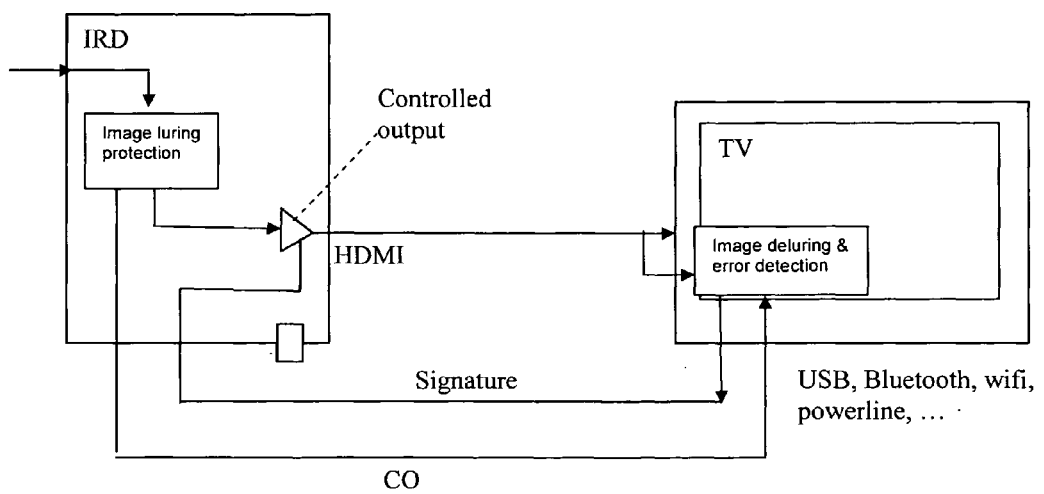

The FIG. 7 illustrate a case when the signature is calculated by the display device The FIG. 8 illustrates a case when the back channel is used to control the access to the content

DESCRIPTION OF THE VARIOUS EMBODIMENTS

Figure 1:
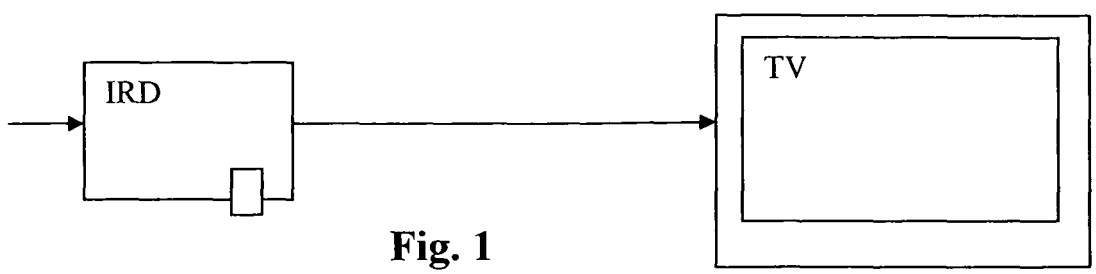

The FIG. 1 illustrates the standard known system. The IRD (Integrated Receiver Decoder) is on one side connected to the broadcast channels, such as via an antenna, cable, or IP, and on the other side is connected to a display device TV. The purpose of the IRD is to receive the signal, convert it into a plurality of channels, and if necessary, decrypt the selected channel with the cooperation of a security module. The selected channel is then transmitted to the TV via an HDMI cable. Other functions are also proposed by the IRD such as recording an event, either directly while it is broadcasted, or according to a programmed time/date.

The IRD is also in charge of the reception, preparation and display of the Electronic Program Guide (EPG) that helps the user to quickly access the desired channel.

The HDMI communication is protected by HDCP protocol which defines the frame of data exchange. HDCP is based on certificates verification and data encryption. Before the data are outputted by a source device, a handshake is initiated during which the certificate of the source and the sink are exchanged. The received certificate (e.g. X509) is then verified and used to establish a common encryption key. The verification can use white or black lists.

The FIG. 2 shows the so-called "man-in-the-middle" attack in which an additional device MM is placed at the output of the IRD and intercepts the audio/video data stream. The risk in such a case is to bypass the security rules that were associated with the content such as "view only", "view once", "no record". The fact that the content is in an external device opens the possibility for a third party to use the content in a way not authorized by the content provider. The aim of this patent application is to detect the presence of such external and in-between device by the IRD and take appropriate action.

To prevent manipulation of transmitted video data by such an additional device MM, the system of the present invention suggests to define a variable area on the display device, then to store reference data corresponding to these video data which are sent to the display device. On the other side of the system, it comprises means to extract the displayed video data contained within the same area and means to send back to the IRD, test data referring to the extracted video data. Finally, the system comprises means to compare test data with reference data and means to take appropriate measures in case of difference resulting from this comparison.

The variable area defined on the display device corresponds to a portion of the display which is changing at each time the system checks if manipulations have been made on the reference video data. By limiting the area to be processed by the system of the present invention to a part of the display device, e.g. to a relatively small size area, the reference data and the test data are small sizes too and can be advantageously quickly transferred between the devices located at the two ends of the system. Responsiveness of the system is also improved.

The variable area can be defined by coordinates within a two dimensions system. These coordinates can be sent from the IRD to means in charge of extracting the predefined area of the actual displayed video data within an encrypted message. This message can be parameterized by a proprietary encryption key known only by the two devices in communication, namely the IRD and the extracting means. The latter being internal or external to the display device.

In order to proceed with the comparison of the data, the system also comprises means to temporarily store reference data corresponding to video data of the area sent to the display device. These data being stored until the comparison of test data with reference data is made.

According to the preferred embodiment of the invention, the location of the variable area defined on the display device is determined according to a pseudo random process so as to be unpredictable. Further, such a process can be sampling process which progressively checks the whole possible areas of the display device, taking into account the areas which have been already checked.

The FIG. 3 illustrates the invention using a dongle as means to determine the actual displayed image. A dongle DG-SN is connected to the display device with the aim of gathering information about what is currently displayed on the device. This can be done by outputting the HDMI signal entering into the display device toward the dongle. For that purpose, the dongle can be connected to the HDMI output of the display device or to another interface such as CI+, for instance in case the dongle has the shape of a CI+ card and is powered by a CI+ interface of the display device.

According to a preferred embodiment of the invention, the system comprises means to calculate a reference signature on video data, limited to the variable area, which are sent to the display device and a test signature on extracted video data within the same area. Preferably, reference data, used during the data comparison, correspond to this reference signature and test data, sent back to the IRD, correspond to this test signature.

Typically, the dongle DG can comprise means to extract the video data displayed in the variable area and/or means to calculate the signature on these extracted video data; this signature being compared with a reference signature calculated by the IRD according to the preferred embodiment. The comparison of both signatures can be executed within the dongle DG or by the IRD. In the first case, the dongle receives the reference signature from the IRD through another connection, such as a USB connection and simply send back a signal for positive or negative comparison to the IRD. In the second example, the dongle transmits the test signature of the displayed image to the IRD and the latter executes the comparison.

Each signature is calculated firstly by using a hash function applied to the video data to be signed. A digest is obtained as a result from this hash function. Secondly, this digest is then encrypted by an encryption function. The hash or digest ensures the integrity of the video data and its encryption ensures the authentication. Thus, the data sent to the IRD are encrypted by the dongle or by any means used to calculate the signature on the extracted data. In case video data are directly sent to the IRD for calculating the signature, these video data are firstly encrypted by the dongle or any other means before to be sent.

Alternately, the video data comprised inside the variable area and which are sent to the display device can be directly used as reference data without calculating a signature on this data. In the same way, the extracted video data which are sent to the IRD can be directly used as test data. However, it is more judicious to use the signature of the video data sent to the display device as reference data and to use the signature of the extracted data as test data.

The FIG. 4 illustrates an embodiment similar to that of FIG. 3. The only difference is the connection between the dongle DG-SN and the IRD which is wirelessly. In this case, the IRD comprises no wireless means and this is why the IRD is connected to a transmitter RC. The transmitter RC is for example connected with the IRD thanks to an USB connection.

The FIG. 5 is similar to the FIG. 4 with a dongle external to the display device and wireless received on the IRD side.

The FIG. 6 is based on the same principle but the dongle described above is included into the IRD. The display device TV comprises an output that gives the data currently displayed e.g. HDMI output. The IRD then calculate the signature based on the received data and compare it with the one calculated on the video data sent by the HDMI output of the IRD.

The FIG. 7 is still based on signature comparison, the display device having a processing module that can calculate the signature on the displayed image. This signature is then sent to the IRD by various means, such as USB, Bluetooth, wifi, powerline. The IRD calculates the reference signature on the image sent to the display device and compares the received signature, namely the test signature, with the reference signature.

The system of the invention comprises means for switching the operating mode of the system from a standard or regular mode to a disrupted mode in case of difference between these signatures. According to the preferred embodiment, the IRD comprises means to interrupt the transmission of video signal in case of difference. However, it should be understood that other measures could be undertake in case of difference between the couple of signatures.

Another aspect of this embodiment, which is common to the previous one about the video data to be used for the comparison, is the synchronization between the module processing with the displayed image (e.g. by calculating the test signature) and the module processing with the reference image (e.g. by calculating the reference signature). This synchronization aims at defining which image, namely which reference data and which test data, will serve as the basis of the calculation of the signatures for instance. For the sake of understanding, the module within the display device (or attached to the display device) will be named "receiver signature module" and the equivalent module within the IRD is named "emitter signature module". The IRD can send a command to the receiver signature module that trigs the calculation of the signature. This command can comprise the indication (e.g. coordinates) about the area on which the calculation should be done. The command sent by the IRD to the receiver signature module can also indicate a frame index. The display device displays a succession of frame, each having an index. When the proper index is detected, the receiver signature module calculates the test signature and sends it to the IRD (or compares it locally with the reference signature received from the IRD).

Another embodiment to ensure the synchronisation of the images resulting from reference data and the images resulting from test data is to calculate the transmission delay needed by the system between the time where the video data to be displayed are sent by the IRD and the time where these data are effectively displayed by the display device. This transmission delay can be different from one system to another given that each system does not necessarily comprise the same components/devices. A solution to determine this transmission delay is to send a signal emitted by the IRD, for instance by generating a marker during a short time, as a clear marker which can be reliably detected by the receiver module or by means which is in charge of extracting the video data, and to calculate the elapsed time between the emission and the reception of this signal. Once determined, the transmission delay of the video data from the emitter to the receiver module of the system can be used to configure the extraction process and to ensure that the reference data are compared with the appropriate test data. As the time required until an image is displayed can slightly fluctuate, a tolerance can be allocated to the transmission delay. Typically, such tolerance may be in the order of some milliseconds. If needed, the transmission delay and/or the tolerance can be sent to the extraction means and/or to the receiver module via a command or a specific message. All of these operations could be, for example, contained within a calibration process which could be implemented by a calibration means. According to the preferred embodiment, means to extract the actual displayed video data comprises means to trigger the extraction so that the extracted video data refer to the corresponding video data sent to the display device. To this end, the trigger means are configured to take into account the afore-mentioned transmission delay.

The FIG. 8 illustrates another embodiment based on the technology describes in the document WO 2004/073292. The audio/video data entering into the IRD are lured, i.e. part of the data are extracted and replaced by dummy data. The IRD thus create two streams, one modified stream and one control object. The modified stream is sent in a conventional way to the display device, e.g. using HDMI. The control object CO created by the IRD and contains the data extracted during this luring phase. The control object CO can be sent to an equivalent module attached (or within) the display device for reconstructing the original audio/video stream. A further function of the reconstruction module is to check the consistency of the reconstructed stream. This module, once the original data being re-establish into the proper location into the modified stream, can calculate a checksum on the expected original stream (or equivalent verification information). This verification can take various forms, such as verifying the dummy value that was inserted in lieu of the original value into the modified stream. It can be the verification of another value at a location indicated into the second stream or a hash value of a packet of data. The result of the verification is then sent to the IRD that can take the necessary measures in case of difference.

The present invention also refers to a decoder to be used within a system for preventing manipulation of transmitted video data, comprising means for receiving audio/video data and means for transmitting an HDMI compliant audio/video data stream to be displayed on a display device. This decoder comprises means to define a variable area at a location of an image displayed on the display device, means to store reference data corresponding to video data of said area which are sent to be displayed, means for receiving test data determined from extracted data displayed on said display device, means to compare said test data with said reference data, means for switching an operating mode of the decoder from a standard mode to a disrupted mode in case of difference resulting from this comparison.

In a preferred embodiment, the location of said variable area is determined according to a pseudo random process, said location being communicated to the display device.

Further, the location is preferably determined according to a sampling process which progressively checks the whole possible areas of the display device.

The present invention also refers to a dongle to prevent manipulation of transmitted video data. This dongle comprises means for connecting it to a display device displaying video data, means for extracting a part of said video data according to a variable area of said display device and means for sending test data determined from the extracted video data.

In a preferred embodiment, means for connecting the dongle to the display device are wireless means. Alternately, these means can be HDMI means.

In another embodiment, the dongle comprises means to calculate a signature on the extracted video data and to define said signature as being the test data to be sent to another device, such as a decoder for comparing these test data with reference data.

The invention claimed is:

1. A system to prevent manipulation of transmitted video data, the system comprising;
    a display device configured to display an image based on a HDMI compliant audio/video data stream;
    an Integrated Receiver Decoder (IRD) configured to,
        transmit, to the display device, the HDMI compliant audio/video data stream,
        define a variable area at a location of the image according to a pseudo random process, and
        store reference data corresponding to video data to be displayed within said variable area;
    an extraction device, internal or external to the display device, configured to extract actual displayed video data within said variable area and to determine test data based on said extracted actual displayed video data;
    a transmitting device configured to send, to said 1RD, the test data determined from said extracted actual displayed video data;
    a comparing device configured to compare said test data with said reference data; and
    a switching device configured to switch an operating mode of the system from a standard mode to a disrupted mode in case of a difference resulting from the comparison.

2. The system of claim 1, wherein the extraction device is configured to trigger the extraction of the actual displayed data, the actual displayed data corresponding to video data transmitted to the display device, said triggering taking into account a transmission delay which corresponds to a time interval between an instant when the video data to be displayed are sent by the IRD and an instant when these data are displayed by the display device.

3. The system of claim 1, wherein the pseudo random process is a sampling process which progressively checks the whole possible areas of the display device.

4. The system of claim 1, further comprising at least one calculator configured to calculate:
   a reference signature of video data corresponding to said variable area, and
   a test signature of the test data, wherein the comparing device is configured to compare the test data and the reference data taking into account the reference signature and the test signature.

5. The system of claim 1, wherein at least one of the extraction device and said transmitting device are parts of a dongle which is connected to the IRD.

6. The system of claim 1, wherein said switching device allows interrupting the transmission of video signal in case of the difference in said comparison.

7. The system of claim 2, wherein said transmission delay is determined by a calibration that measures the time interval as being a time between a first instant when a signal is emitted by the IRD and a second instant when the signal is received by the display device.

8. The system of claim 4, wherein the displayed video data are a succession of frames, and the extraction device is configured to receive a triggering signal from the IRD, said triggering signal indicating which frame is to be extracted for the calculation of the test signature.

9. The system of claim 5, wherein the connection between the dongle and the IRD is wireless.

10. The system of claim 5, wherein the dangle is connected to a HDMI output of the display device.

11. The system of claim 5, wherein the dongle includes a calculator configured to calculate a test signature from said test data.

12. The system of claim 5, wherein the IRD includes the comparing device.

13. A decoder for use within a system for preventing manipulation of transmitted Video data, the decoder being configured to,
   receive audio /video data,
   transmit an HDMI compliant audio/video data stream to be displayed on a display device,
   define a variable area, according to a pseudo random process, at a location of an image displayed on the display device,
   store reference data corresponding to video data within said variable area,
   receive test data detelinined from extracted data displayed on said display device, the extracted data corresponding to actual displayed video data within the variable area,
   compare said test data with said reference data, and
   switch an operating mode of the decoder from a standard mode to a disrupted mode in case of a difference resulting from the comparison.

14. The decoder of claim 13, wherein the pseudo random process is a sampling process which progressively checks the whole possible areas of the display device.

15. A dongle to prevent manipulation of transmitted video data, the dongle being configured to,
   connect to a display device displaying video data,
   extract a part of said video data according to a variable area of said display device, the extracted part of said video data corresponding to actual displayed video data within the variable area, the variable area being defined based on a pseudo random process, and
   send test data determined from the extracted video data to be compared to reference data, the reference data being the video data to be displayed within the variable area on the display device, wherein
   upon a determination that the test data is different from the reference data an operating mode of an Integrated Received Decoder (IRD) is switched from a standard mode to a disrupted mode to prevent manipulation of the transmitted video data.

16. The dongle of claim 15, wherein the dongle is configured to connect to the display device with a wireless connection.

17. The dongle of claim 15, wherein the dangle is configured to connect to the display device with a HDMI connection.

18. The dongle of claim 15, wherein the dongle is further configured to calculate a signature of the extracted video data and to define said signature as being said test data.

* * * * *